US005720703A

United States Patent [19]

Chen et al.

[11] Patent Number: 5,720,703

[45] Date of Patent: Feb. 24, 1998

[54] AMORPHOUS FLUOROPOLYMER COATED FUSING MEMBER

[75] Inventors: Jiann Hsing Chen, Fairport; Lawrence Paul Demejo, Rochester; Gary Frederick Roberts, Macedon, all of N.Y.

[73] Assignee: Eastman Kodak Company, Rochester, N.Y.

[21] Appl. No.: 674,222

[22] Filed: Jun. 28, 1996

[51] Int. Cl.$^6$ .......... B32B 27/00

[52] U.S. Cl. .......... 492/56; 492/53; 428/36.8

[58] Field of Search .......... 492/56, 53, 49; 428/36.8, 36.9, 447

[56] References Cited

U.S. PATENT DOCUMENTS

| | | | |
|---|---|---|---|
| 4,196,256 | 4/1980 | Eddy et al. | 428/422 |
| 4,375,505 | 3/1983 | Newkirk | 430/99 |
| 4,430,406 | 2/1984 | Newkirk | 430/99 |
| 4,948,851 | 8/1990 | Squire | 526/247 |
| 5,336,539 | 8/1994 | Fitzgerald | 428/36.8 |
| 5,336,772 | 8/1994 | Badisha et al. | 492/56 |
| 5,339,142 | 8/1994 | Fukunaga | 428/36.4 |
| 5,376,448 | 12/1994 | Suzuki | 492/56 |
| 5,411,779 | 5/1995 | Nakajima et al. | 428/36.91 |
| 5,464,698 | 11/1995 | Chen et al. | 492/56 |
| 5,474,821 | 12/1995 | Kass | 428/35.6 |
| 5,559,631 | 9/1996 | Chen et al. | 428/421 |

*Primary Examiner*—Irene Cuda
*Attorney, Agent, or Firm*—John R. Everett

[57] ABSTRACT

A fuser member for fusing a thermoplastic resin toner image to a substrate having:

(a) a rigid metal core;

(b) a base cushion layer covering the metal core wherein the base cushion comprises a condensation cured polydimethylsiloxane or an addition cured silicone rubber;

(c) a cured fluoroelastomer layer covering the base cushion layer;

(d) an aminosilane adhesive coveting the fluoroelastomer layer; and (e) an amorphous fluoropolymer covering the aminosilane adhesive layer.

8 Claims, No Drawings

AMORPHOUS FLUOROPOLYMER COATED FUSING MEMBER

FIELD OF THE INVENTION

This invention relates to electrophotography. More particularly, it relates to fusing heat-softenable toner material to a substrate.

BACKGROUND OF THE INVENTION

Heat-softenable toners are widely used in imaging methods such as electrostatography, wherein electrically charged toner is deposited imagewise on a dielectric or photoconductive element bearing an electrostatic latent image. Most often in such methods, the toner is then transferred to a surface of another substrate, such as, e.g., a receiver sheet comprising paper or a transparent film, where it is then fixed in place to yield the final desired toner image.

When heat-softenable toners, comprising, e.g., thermoplastic polymeric binders, are employed, the usual method of fixing the toner in place involves applying heat to the toner once it is on the receiver sheet surface to soften the toner and then allowing or causing the toner to cool.

One such well-known fusing method comprises passing the toner-beating receiver sheet through the nip formed by a pair of opposing rolls, at least one of which (usually referred to as a fuser roll) is heated and contacts the toner-bearing surface of the receiver sheet in order to heat and soften the toner. The other roll (usually referred to as a pressure roll) serves to press the receiver sheet into contact with the fuser roll. In some other fusing methods, the configuration is varied and the "fuser roll" or "pressure roll" takes the form of a flat plate or belt. The description herein, while generally directed to a generally cylindrical fuser roll in combination with a generally cylindrical pressure roll, is not limited to fusing systems having members with those configurations. For that reason, the term "fuser member" is generally used herein in place of "fuser roll" and the term "pressure member" in place of "pressure roll".

It is a constant challenge to design a fuser roller and a fuser system which provides for improved release of the heated toner and toner-bearing receiver from the fuser roller, and for the extended life of the fuser roller materials. It is known to use a thin coating of release agents, typically functionalized or nonfunctionalized polysiloxane fluids, on fuser rollers to improve the release of the toner from the fuser roller. Also, the use of different types of coating materials on the fuser roller or pressure roller has been disclosed. For example, fluorocarbon resins like polytetrafluoroethylene (PTFE) or a copolymer of PTFE and perfluoroalkylvinylether, or fluorinated ethylenepropylene have been disclosed, because they have excellent release characteristics due to very low surface energies. Fluorocarbon resins also possess high temperature resistance, and excellent chemical resistance; however, they are not sufficiently flexible to provide for maximum toner contact.

Polyfluorocarbon elastomers (fluoroelastomers), such as vinylene fluoride-hexafluoropropylene copolymers have been disclosed, because they are tough, flexible elastomers that have excellent high temperature resistance; however, they have relatively high surface energies, which compromise toner release. Polyfluorocarbon elastomers also provide poor thermal conductivity. Polysiloxane elastomers, for example poly(dimethylsiloxane) elastomer (PDMS), have been disclosed, because they are flexible and elastic; however, they degrade after a relatively short time due to wear and absorption of release oil. Fuser rollers having multiple layers of these various materials with and without fillers or other addenda, as well as fuser rollers having mixtures of these materials in a single layer, have been previously disclosed.

It is well known that the low surface energy fluoropolymers are difficult to adhere to any substrate. The two main reasons to are (1) low surface energy of fluoropolymer leads to poor wetting and (2) regions of low cohesive strength on the surface of fluoropolymer leads to a weak boundary layer.

A few varieties of pretreatment methods to enhance the adhesion of the semicrystalline fluoropolymer polytetrafluoroethylene (PTFE) coating have been developed commercially since 1951 and are still in use today. However, none of them is associated with a new generation of amorphous Teflon fluoropolymer resins. Many of the treatments to enhance the adhesion of PTFE coatings are based on phosphatizing technology and involved the use of chromic oxide, phosphoric acid and polytetrafluoroethylene aqueous dispersion. These treatments are only applicable to metal substrates.

SUMMARY OF THE INVENTION

The present invention provides a fuser member for fusing a thermoplastic resin toner image to a substrate having:

(a) a rigid metal core;

(b) a base cushion layer covering the metal core wherein the base cushion comprises a condensation cured polydimethylsiloxane or an addition cured silicone rubber;

(c) a cured fluoroelastomer layer covering the base cushion layer;

(d) an aminosilane adhesive covering the fluoroelastomer layer; and (e) an amorphous fluoropolymer covering the aminosilane adhesive layer.

Until the present invention no method was available for effectively adhering amorphous fluoropolymers to a fusing member. Both the aminosilane adhesive layer and the underlying cured fluoroelastomer layer are essential in adhering the amorphous fluoropolymer to the base cushion layer.

DETAILS OF THE INVENTION

Amorphous fluoropolymer according to structure 1 above are available from E. I. Dupont with glass transition temperatures at 160° C. (Teflon AF 1600) or 240° C. (Teflon 2400). These materials have unusual properties such as low surface energy, low moisture absorption and solution coating capability. However their potential use as release coatings could not be realized until the present invention. Until the present invention no means were available to effectively form coatings on substrates suitable for fusing devices that would survive continuous thermal cycling, abrasion wear and still provide outstanding adhesion to the substrate. In the present invention the amorphous fluoropolymer is adhered to an underlying cured fluoroelastomer layer with an amino silane adhesive.

The amino silane adhesives useful in the present invention are disclosed in U.S. Pat. No. 5,332,641. Particularly effective adhesives, available from United Chemical, include N-(2-aminoethyl)-3-aminopropyl trimethoxysilane (A0700); 3-aminopropyl trimethoxysilane (A0800); 3-aminopropyl triethoxysilane (A0750) and 3-aminopropyl methyldiethoxysilane (A0742).

The amino silane adhesive layer is coated over the cured fluoroelastomer layer. The latter layer is formed from the uncured fluorocarbon random copolymer having subunits with the following general structures:

$—(CH_2CF_2)_x—$ (vinylidene fluoride subunit ("VF")), $—(CF_2CF_2)_z—$ (tetrafluoroethylene subunit ("TFE")), and

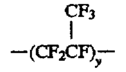 (hexafluoropropylene subunit ("HFP")).

In these formulas, x, y, and z are mole percentages of the individual subunits relative to a total of the three subunits (x+y+z), referred to herein as "subunit mole percentages". (The curing agent can be considered to provide an additional "cure-site subunit", however, the contribution of these cure-site subunits is not considered in subunit mole percentages.) In the fluorocarbon copolymer, x has a subunit mole percentage of from 30 to 90 mole percent, y has a subunit mole percentage of from 10 to 70 mole percent, and z has a subunit mole percentage of from 0 to 34 mole percent. In a currently preferred embodiment of the invention, subunit mole percentages are: x is from 40 to 80, y is from 10 to 60, and z is from 0 to 34; or more preferably x is from 42 to 75, y is from 14 to 58, and z is 0. In the currently preferred embodiments of the invention, x, y, and z are selected such that fluorine atoms represent at least 70 percent of the total formula weight of the VF, HFP, and TFE subunits.

Suitable uncured random fluorocopolymers are available commercially. In a particular embodiment of the invention, a vinylidene fluoride-co-hexafluoropropylene was used which can be represented as $—(VF)_{75}—(HFP)_{25}—$. This material is marketed by E. I. dupont de Nemours and Company under the designation "Viton A" and is referred to herein as "Viton A". In another embodiment of the invention, a vinylidene fluoride-co-hexafluoropropylene was used which can be represented as $—(VF)_{42}—(HFP)_{58}—$. This material is marketed by Minnesota Mining and Manufacturing, St. Paul, Minn., under the designation "Fluorel FX-2530" and is referred to herein as "FX-2530". Other suitable uncured vinylidene fluoride-co-hexafluoropropylenes and vinylidene fluoride-co-tetrafluoroethylene-co-hexafluoropropylenes are available, for example, Fluorel FX-9038.

The molecular weight of the uncured polymer is largely a matter of convenience, however, an excessively large or excessively small molecular weight would create problems, the nature of which are well known to those skilled in the art. In a preferred embodiment of the invention the uncured polymer has a number average molecular weight in the range of about 100,000 to 200,000.

To form the fluoroelastomer layer, the uncured fluorocarbon polymer, crosslinking agent, and any other additives, such as an accelerator; and acid acceptor type filler, are mixed to form a composite then the composite can be applied over the base cushion layer and cured. The crosslinking agent can be a basic nucleophile. Basic nucleophilic cure systems are well known and are discussed, for example, in U.S. Pat. No. 4,272,179, incorporated herein by reference. One example of such a cure system combines a bisphenol as the crosslinking agent and an organophosphonium salt, as an accelerator. Examples of bisphenol include 2,2-bis(4-hydroxyphenyl) hexafluoropropane, and 4,4-isopropylidenediphenol:

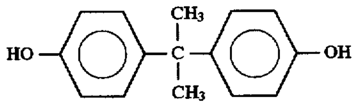

Examples of organophosphonium salts include halides such as benzyl triphenylphosphonium chloride:

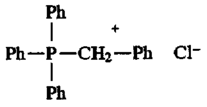

The crosslinking agent is incorporated into the polymer as a cure-site subunit, for example, bisphenolic residues. Other examples of nucleophilic addition cure systems are sold commercially as DIAK No. 1 (hexamethylenediamine carbamate) and DIAK No. 3 (N,N'-dicinnamylidene-1,6-hexanediamine) by E. I. duPont de Nemours & Co. Nucleophilic addilion-cure systems used in conjunction with fluorocarbon polymers can generate hydrogen fluoride and thus acid acceptors are added as fillers. Suitable acid acceptors include Lewis acids such as metal oxides or hydroxides, for example, magnesium oxide, calcium hydroxide, lead oxide, copper oxide and the like. In the preferred embodiment, 3 parts MgO and 6 parts $Ca(OH)_2$ per 100 parts of fluoroelastomer are used as acid acceptors in the fluoroelastomer layer composition.

Other conventional cure or crosslinking systems may be used to cure the fluoroelastomers useful in the present invention, for example, free radical initiators, such as an organic peroxide, for example, dicumylperoxide and dichlorobenzoyl peroxide, or 2,5-dimethyl-2,5-di-t-butylperoxyhexane with triallyl cyanurate; however, the nucleophilic addition system is preferred.

Curing of the fluoroelastomer layer is carried out according to the well known conditions for curing fluoroelastomers ranging, for example, from about 12–48 hours at temperatures of between 50° C. to 250° C. Preferably the coated fluoroelastomer layer is dried until solvent free at room temperature, then gradually heated to about 230° C. over 24 hours, then maintained at that temperature for 24 hours.

The cured fluoroelastomer layer is coated over the base cushion layer. Suitable materials for the base cushion layer include any of a wide variety of materials previously used for base cushion layers, such as the condensation cured polydimethylsiloxane marketed as EC-4952 by Emerson Cumings.

The thicknesses of the base cushion and outer layers and the composition of the base cushion layer can be chosen so that the base cushion layer can provide the desired resilience to the fuser member, and the outer layer can flex to conform to that resilience. The thickness of the base cushion and outer layers will be chosen with consideration of the requirements of the particular application intended. Usually, the outer layer would be thinner than the base cushion layer. For example, base cushion layer thicknesses in the range from 0.6 to 5.0 mm have been found to be appropriate for various applications. In some embodiments of the present invention, the base cushion layer is about 2.5 mm thick, and the outer layer is from about 25 to 30 micrometers thick.

The core of the fuser member is usually cylindrical in shape. It comprises any rigid metal or plastic substance. Metals are preferred when the fuser member is to be internally heated, because of their generally higher thermal conductivity. Suitable core materials include, e.g., aluminum, steel, various alloys, and polymeric materials such as thermoset resins, with or without fiber reinforcement.

The adhesive layer, the fluoroelastomer layer and the amorphous fluoropolymer layer can be coated with conventional techniques. Ring coating techniques are preferred. Coating solvents which can be used include polar solvents, for example, ketones, acetates and the like. Preferred solvents for the fluoroelastomer composites are the ketones, especially methyl ethyl ketone (MEK) and methyl isobutyl ketone. The preferred solvent is a blend of MEK and methanol, most preferably 85:15 by weight MEK:methanol.

The fluoroelastomer is dispersed in the coating solvent at a concentration of between about 10 to 50 weight percent, preferably between about 20 to 30 weight percent and coated on the fuser member to a thickness of 0.025 to 0.25 mm on drying. The coated article is cured under the conditions described above.

Other coating methods include dip coating, disk coating and spray coating using the same solvents mentioned above. Ring coating an overcoat layer is currently preferred. In ring coating, a ring or gasket of the proper diameter is provided. The roll is brought up through the ring and coating material is provided on the top of the ring or gasket. As the roll passes, coating composition is taken up by the roll. The thickness is determined by the viscosity of the coating composition, by the speed at which the roll is drawn up through the ring and by other factors known in the art.

The fuser member is mainly described herein in terms of embodiments in which the fuser member is a fuser roll. The invention is not, however, limited to a roll, nor is the invention limited to a fusing member having a core bearing two layers: the base cushion layer and the outer layer. The fuser member of the invention can have a variety of outer configurations and layer arrangements known to those skilled in the art. For example, the base cushion layer could be eliminated or the outer layer described herein could be overlaid by one or more additional layers.

Some fusing systems use a release oil, such as a PDMS oil, to prevent offset, that is, to aid the roll in releasing from the toner it contacts during the fusing operation. During use, the oil is continuously coated over the surface of the fuser member in contact with the toner image. The fuser member of the invention can be used with or without a release oil. If a release oil is used a polydimethylsiloxane or a mercapto functionalized polydimethylsiloxane release oil can be used at normally used application rates or at reduced application rates, from about 0.5 mg/copy to 10 mg/copy (the copy is 8.5 by 11 inch 20 pound bond paper.

The invention is further illustrated by the following Examples and Comparative Examples.

EXAMPLES

A fusing member according to the invention was prepared as follows.

A cylindrical aluminum core was primed with a silicone adhesive supplied by General Electric (SS-4044). SS-4044 is polydimethylsiloxane mix with methyl silsesquioxanes dissolved in acetone, isopropylalcohol, toluene and butyl alcohol. A base cushion layer of EC-4952 was coated over the primer. EC-4952 is a silanol-terminated polydimethylsiloxane having about 85 mole percent difunctional dimethylsiloxane repeating units, and about 15 mole percent trifunctional methlysiloxane repeating units and a number average molecular weight of about 21,000. EC-4952 also contains aluminum oxide and iron oxide fillers.

The EC4952 coating is then cured at room temperature. The coated aluminum core is then placed in an oven in which the temperature is raised to about 210° C. over 12 hours. The temperature is maintained at 210° C. for 18 hours. After air cooling, the EC4952 coating was ground to a thickness of 2.5 mm (100 mils).

The cured EC-4952 was corona discharged for 1 minute at 750 watts. A fluoroelastomer polymer, available as Viton A from E. I. Dupont de Nemours and Company, was coated over the layer. Viton A was mixed as a 25 weight percent solids solution in a 1 to 1 mixture of methyl ethyl ketone and methyl isobutyl ketone. The resulting material was ring coated onto the cured EC-4952 layer, air dried for 16 hours, baked by ramping for 24 hours to 232° C. and then maintaining the temperature at 232° C. for 24 hours. The resulting outer layer of fluoroelastomer had a thickness of 25 μm (1 mil).

A0700 adhesive (1 gm), available from United Chemical, is dissolved at 50% by weight in 1 g of methanol, followed by the addilion of 0.2 g of distilled water. The mixture is allowed to equilibrate for 20 minutes. The mixture is diluted with 46 g of methyl ethyl ketone (high boiling point polar solvent). The mixture is then hand coated over the fluoroelastomer coating. The adhesive is then air dried 30 minutes, followed by baking 30 minutes at 110° C. and allowed to cool.

TeflonAF 1600 was dissolved in Fluorinert FC-75 (3M Company) to form a 2.5 TeflonAF 1600 weight percent solution. The latter solution was then ring coated over the above adhesive layer. The coating was allowed to dry. The coating was then cured in an oven in which the temperature was raised to 110° C. over 1 hour. The coating was then maintained for 2 hours at 110° C. Then the coating was further cured in an oven in which the temperature was raised to 170° C. for 1 hour. The coating was then maintained in the oven for 5 minutes at 170° C. The dry thickness of the Teflon AF 1600 coating was 5 μm.

The fusing temperature range for this fusing member was determined in the absence of oil. The fusing temperature range is the temperature range within which toner is fused to a receiver and does not offset onto the fusing member. The fusing temperature range is also referred to as the fusing window or Fw. The Fw is equal to the difference between the hot offset temperature (T off) and the minimum temperature at which the toner is acceptably fixed to the receiver (T min). At the hot offset temperature, cohesive forces within the toners are less than the adhesive forces between the toner and the fusing surface; therefore, the toner will adhere or offset onto the fusing member. The FW is dependent on the toner, release agents added to the toner, the surface of the fusing member and the release oils added into the fusing member. In the following test, no release oil were used to coat the surface of the fusing members.

The toner used in this test was Almacryl B-1509, a styrene acrylate toner available from hr, age Polymers. The Almacryl B-1509 has incorporated into its formulation a propylene wax release additive. The amount of the polypropylene wax incorporated into the toner is indicated in the Table below. The fuser system was that of an Ektaprint-150 copier machine made by Eastman company except the sample fuser (the fuser roller coated with Viton, primer and Teflon AF 1600) was substituted into the system. The fuser speed was 10.12 cm per second (4 inches per second). The Fw for the Teflon AF 1600 overcoated fusing roller is recorded below.

TABLE

| Oil-Less Fusing Window Test | | | | | | |
|---|---|---|---|---|---|---|
| Roller I.D. | Teflon AF Roller | | | EC-4952 Roller | | |
| Toner Additive | Tmin | Toff | FW | Tmin | Toff | FW |
| None | 121° C. | 149° C. | 28° C. | 93° C. | 149° C. | 56° C. |
| 5 PPH | 121° C. | 218° C. | 97° C. | 93° C. | 162° C. | 69° C. |
| 10 PPH | 121° C. | 218° C. | 97° C. | 93° C. | 176° C. | 83° C. |

The oil-less fusing window test indicates that the fusing window of the fusing roller of this invention is similar to or slightly better than the standard EC-4952 roller used in Ektaprint 150 copiers.

A fuser roller with a larger fusing window usually has less toner offset and a longer life. Of particular importance is that the coating of this invention provided a non-off swelling release coating surface which will reduce the non-uniformity of the roller surface due to the oil absorption the EC-4952 red rubber layer.

The following comparative examples illustrate the adherence of the amorphous teflon layer in the absence of the fluoroelastomer and aminosilane adhesive layers:

COMPARATIVE EXAMPLE 1

Using an epoxy adhesive such as Thixon 300/311 as a primer between EC-4952 red rubber layer and Teflon AF 1600 overcoat, the coating came off during the fusing window test.

COMPARATIVE EXAMPLE 2

Using corona discharge (CDT) treated the EC-4952 rubber surface overcoated with Teflon AF 1600, the coating delaminated during the testing.

COMPARATIVE EXAMPLE 3

Using the aminosilane A700 only as a priming layer without Viton adhesive layer, the coating came off during the testing.

The invention has been described in detail with particular reference to a preferred embodiment thereof. However it will be understood that variations and modifications can be effected within the spirit and scope of the invention as described hereinabove and defined in the appended claims.

We claim:

1. A fuser member for fusing a thermoplastic resin toner image to a substrate having:

(a) a rigid metal core;

(b) a base cushion layer covering the metal core wherein the base cushion comprises a condensation cured polydimethylsiloxane or an addition cured silicone rubber;

(c) a cured fluoroelastomer layer covering the base cushion layer;

(d) an aminosilane adhesive covering the fluoroelastomer layer; and (e) an amorphous fluoropolymer covering the aminosilane adhesive layer.

2. The fuser member of claim 1 wherein the rigid core is selected from a cylinder of stainless steel or a cylinder of aluminum.

3. The fuser member of claim 1 or 2 wherein the amorphous fluoropolymer has the structure (1):

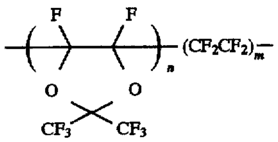

wherein m is 20 mole percent or 35 mole percent and n is 65 mole percent or 80 mole percent.

4. The fuser member of claim 3 wherein the base cushion cured polydimethylsiloxane.

5. The fuser member of claim 3 wherein the cured fluoroelastomer coveting the base cushion layer is formed from uncured (a) vinylidene-fluoride-co-hexafluoropropylene or (b) vinylidene fluoride-co-tetrafluoroethylene-co-hexafluoropropylene.

6. The fuser member of claim 3 wherein the amino silane adhesive is selected from the group consisting of N-(2-aminoethyl)-3-aminopropyl trimethoxysilane; 3-aminopropyl trimethoxysilane; 3-aminopropyl triethoxysilane and 3-aminopropyl methyldiethoxysilane.

7. The fuser member of claim 3 wherein the amino silane adhesive is N-(2-aminoethyl)-3-aminopropyl trimethoxysilane.

8. A fuser roller for fusing a thermoplastic resin toner image to a substrate having:

(a) a rigid cylindrical aluminum core;

(b) a base cushion layer covering the core wherein the base cushion comprises a condensation cured polydimethylsiloxane rubber;

(c) a cured fluoroelastomer covering the base cushion layer is formed from uncured (i) vinylidene-fluoride-co-hexafluoropropylene or (ii) vinylidene fluoride-co-tetrafluoroethylene-co-hexafluoropropylene;

(d) N-(2-aminoethyl)-3-aminopropyl trimethoxysilane adhesive covering the fluoroelastomer; and (e) an amorphous fluoropolymer covering the amino silane adhesive layer; wherein the amorphous fluoropolymer has the structure (1):

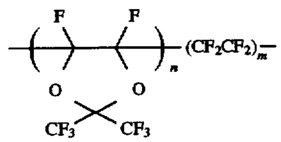

wherein m is 20 mole percent or 35 mole percent and n is 65 mole percent or 80 mole percent.

* * * * *